(12) United States Patent
Fujii et al.

(10) Patent No.: US 10,288,723 B2
(45) Date of Patent: May 14, 2019

(54) MIRROR UNIT, DISTANCE MEASUREMENT DEVICE AND LASER RADAR, AND MOBILE BODY AND FIXED OBJECT HAVING THE MIRROR UNIT AND THE DISTANCE MEASUREMENT DEVICE OR THE LASER RADAR

(71) Applicant: KONICA MINOLTA INC., Chiyoda-ku (JP)

(72) Inventors: Hideyuki Fujii, Yoshikawa (JP); Ryouta Ishikawa, Hino (JP); Naoki Kaneko, Hachioji (JP); Daisuke Sawanobori, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 337 days.

(21) Appl. No.: 15/115,983

(22) PCT Filed: Dec. 16, 2014

(86) PCT No.: PCT/JP2014/083204
§ 371 (c)(1),
(2) Date: Aug. 2, 2016

(87) PCT Pub. No.: WO2015/122095
PCT Pub. Date: Aug. 20, 2015

(65) Prior Publication Data
US 2017/0184705 A1  Jun. 29, 2017

(30) Foreign Application Priority Data

Feb. 13, 2014  (JP) .................................. 2014-025394

(51) Int. Cl.
*G01C 3/08* (2006.01)
*G01S 7/481* (2006.01)
(Continued)

(52) U.S. Cl.
CPC .......... *G01S 7/4817* (2013.01); *G01S 7/4814* (2013.01); *G01S 17/08* (2013.01); *G01S 17/42* (2013.01);
(Continued)

(58) Field of Classification Search
CPC ...... G01S 7/4817; G01S 7/4814; G01S 17/08; G01S 17/42; G01S 17/936; G01S 2013/9392; G02B 5/09; G02B 26/121
See application file for complete search history.

(56) References Cited

U.S. PATENT DOCUMENTS 5,198,919 A    3/1993  Reeder
5,268,565 A   12/1993  Katoh et al.
(Continued)

FOREIGN PATENT DOCUMENTS

DE   202005005448    7/2005
JP     50-109737     8/1975
(Continued)

OTHER PUBLICATIONS

Office Action dated Jul. 9, 2018 which issued in the corresponding Japanese Patent Application No. 2015-562703.
(Continued)

*Primary Examiner* — Samantha K Abraham
(74) *Attorney, Agent, or Firm* — Cozen O'Connor

(57) ABSTRACT

A mirror unit, a distance measurement device and a laser radar, and a mobile body and a fixed object having the mirror unit and the distance measurement device or the laser radar. The mirror unit includes a plurality of pairs of first reflecting surfaces and second reflecting surfaces inclined relative to a rotation axis, and extending in directions crossing each other. The mirror unit rotates about the rotation axis. In the mirror unit, a beam emitted from a light source is reflected on a first reflecting surface, and then reflected on a second
(Continued)

reflecting surface paired with the first reflecting surface. The beam is scanned over an object with the rotation of the mirror unit. In the mirror unit, the first and second reflecting surfaces are formed, respectively, on first and second reflecting members which are combined to select an emission angle of a beam emitted from the mirror unit.

20 Claims, 16 Drawing Sheets

(51) Int. Cl.
  *G02B 5/09*   (2006.01)
  *G01S 17/93*   (2006.01)
  *G01S 17/42*   (2006.01)
  *G01S 17/08*   (2006.01)
  *G02B 26/12*   (2006.01)
  *G01S 13/93*   (2006.01)

(52) U.S. Cl.
  CPC .............. *G01S 17/936* (2013.01); *G02B 5/09* (2013.01); *G02B 26/121* (2013.01); *G01S 2013/9392* (2013.01)

(56) References Cited

U.S. PATENT DOCUMENTS

2002/0140924 A1*   10/2002   Wangler ................ G01S 7/4802
                          356/28
2003/0035188 A1*   2/2003   Tominaga ............. G01S 7/4811
                          359/224.1

FOREIGN PATENT DOCUMENTS

| JP | S 50-109737 | 8/1975 |
|---|---|---|
| JP | H01-235915 | 9/1989 |
| JP | 1-315716 | 12/1989 |
| JP | H 01-315716 | 12/1989 |
| JP | 2005-291787 | 10/2005 |
| JP | 2009-98111 | 5/2009 |
| JP | 2009-098111 | 5/2009 |
| JP | 2013-148446 | 8/2013 |

OTHER PUBLICATIONS

Search Report dated Sep. 25, 2017 which issued in the corresponding European Patent Application No. 14882314.9.

* cited by examiner

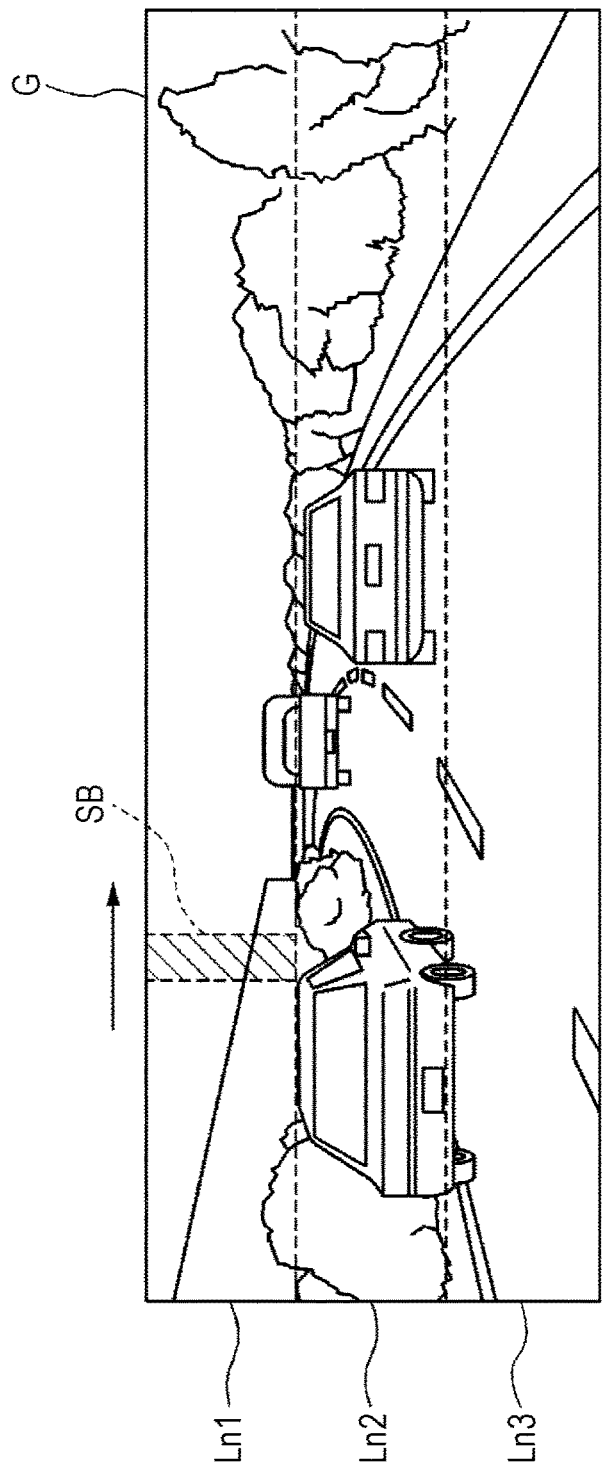

MIRROR UNIT, DISTANCE MEASUREMENT DEVICE AND LASER RADAR, AND MOBILE BODY AND FIXED OBJECT HAVING THE MIRROR UNIT AND THE DISTANCE MEASUREMENT DEVICE OR THE LASER RADAR

RELATED APPLICATIONS

This is a U.S. National Phase Application under 35 USC 371 of International Application PCT/JP2014/083204 filed on Dec. 16, 2014.

This application claims the priority of Japanese application no. 2014-025394 filed Feb. 13, 2014, the entire content of which is hereby incorporated by reference.

TECHNICAL FIELD

The present invention relates to a mirror unit preferably used for a distance measurement device emitting for example a laser beam to detect an object, a distance measurement device and a laser radar, and a mobile body and a fixed object having the mirror unit and the distance measurement device or the laser unit.

BACKGROUND ART

In recent years, in the field of automobiles, security robots, or the like, demand for precise detection of an obstacle in a moving direction has been increased for collision prevention. Furthermore, in infrastructures such as roads or railroads, demand for detection of an obstacle such as a vehicle, human, or an animal has also arisen for prevention of accident and smooth traffic. As a technique for detecting the obstacle, there is known a laser radar being a distance measurement device using optical scanning. In general, the laser radar emits a laser beam to measure a distance to the obstacle based on a time required for detecting reflected light.

As a general laser beam scanning method, there is known a technique for emitting a laser beam to a mirror or a polygon mirror having a plurality of mirror surfaces to scan the laser beam while rotating the polygon mirror.

In particular, the laser radar needs to detect a wide range, and thus a laser beam is required to be emitted to a wide range. An emission range in a scanning angle direction is determined based on a scanning angle and a spot size (cross-sectional size of beam emitted), but the scanning angle direction of the laser beam corresponds to a rotation direction of the mirror, so that the spot size does not need to be increased in the scanning angle direction, and a smaller spot size in the scanning angle direction is preferred, for increased resolution. In contrast, an emission range in a sub-scanning angle direction orthogonal to the scanning angle direction is determined based on the number of scan lines and a spot size of beam emitted (or angle of view of light receiving lens). However, since the number of scan lines has a limitation, the spot size of beam emitted is increased in the sub-scanning angle direction at the center of the scanning angle, and the spot size is often different between a horizontal direction and a vertical direction.

Patent Literature 1 discloses a configuration in which a rotation mirror has first reflecting surfaces and second reflecting surfaces, formed to have an angle of 90° between the first and second reflecting surfaces, beam emitted from a light source along a direction orthogonal to a rotation shaft is scanned after being reflected twice on the first and second reflecting surfaces, so that tilting of the rotation shaft due to rotational deviation may not cause distortion of scan line. Such a mirror configuration may be applied to the laser radar.

CITATION LIST

Patent Literature

Patent Literature 1: JP 50-109737 A

SUMMARY OF INVENTION

Technical Problem

Incidentally, for application of the rotation mirror of Patent Literature 1 to various laser radars, it is desirable to adjust an emission angle of the laser beam emitted from the rotation mirror, for increased versatility. Such adjustment of the emission angle of the laser beam can be performed by arbitrarily changing a combination of a pair of the first and second reflecting surfaces for reflecting the laser beam. However, since the rotation mirror disclosed in Patent Literature 1 is integrally formed, the combination of the pair of the first and second reflecting surfaces cannot be changed arbitrarily. Thus, changing of the emission angle of the laser beam requires whole replacement of the rotation mirror expensively. Furthermore, since the rotation mirror of Patent Literature 1 is integrally formed, the reflecting surfaces need to be precisely positioned in a film forming apparatus to form a film thereon for accurate evaporation or the like on the reflecting surfaces, and time and cost are considerably increased. Alternatively, when the rotation mirror is manufactured by aluminum machining and polishing, machining time and manufacturing cost is considerably increased, and increased capital cost is required to mass production of the rotation mirror. Furthermore, any scratch or stain on a reflecting surface of the rotation mirror requires whole replacement of the rotation mirror, increasing maintenance costs.

The present invention has been made in view of the above circumstances, and an object of the present invention is to provide an inexpensive mirror unit having reduced maintenance costs, excellent versatility, and good precision, a distance measurement device and a laser radar, and a mobile body and a fixed object having the mirror unit and the distance measurement device or the laser radar.

Solution to Problem

In order to achieve at least one of the above objects, a mirror unit according to one aspect of the present invention includes a plurality of pairs of first and second reflecting surfaces, being inclined relative to a rotation axis, and extending in directions crossing each other, and the mirror unit rotates about the rotation axis. In The mirror unit, a beam emitted from a light source is reflected on a first reflecting surface of the mirror unit, and then reflected on a second reflecting surface paired with the first reflecting surface, and the beam is emitted while being scanned over an object according to the rotation of the mirror unit.

The mirror unit includes at least a first reflecting member on which the first reflecting surfaces are formed, and a second reflecting member on which the second reflecting surfaces are formed, and the first and second reflecting members are combined to select an emission angle of a beam emitted from the mirror unit.

According to this mirror unit, since at least the first reflecting member on which the first reflecting surfaces are formed and the second reflecting member on which the second reflecting surfaces are formed are assembled into the mirror unit, the first reflecting member and the second reflecting member are formed separately. Therefore, a plurality of the first reflecting surfaces having precision in the first reflecting member can be formed inexpensively, and a plurality of the second reflecting surfaces having precision in the second reflecting member can be formed inexpensively. In particular, respective inclination angles of the first reflecting surfaces or the second reflecting surfaces are advantageously changed precisely relative to the rotation axis. Furthermore, when the first reflecting member and the second reflecting member are separately formed by molding, molds can be reduced in size and capital cost is reduced, and formation of films on the first reflecting surfaces and the second reflecting surfaces can be facilitated. Then, the first reflecting member and the second reflecting member are assembled to each other to obtain a mirror unit.

In addition, since the emission angle (beam emission angle) of the beam emitted from the mirror unit can be selected according to the combination of the first reflecting member and the second reflecting member, the combination of the first reflecting member and the second reflecting member can be changed to readily change the beam emission angle, for increased versatility to various distance measurement devices. In the present specification, "scanning angle" represents an amplitude angle of light emitted from the light source and reflected from the rotating mirror unit, in a cross-section orthogonal to the rotation axis. Furthermore, "sub-scanning angle" represents an amplitude angle of light emitted from the light source and reflected from the rotating mirror unit, in a cross-section passing through the rotation axis.

The present distance measurement device has the above-mentioned mirror unit.

Use of an LED or a laser for emission of pulsing light as a light source of the distance measurement device allows time of flight (TOF) distance measurement. The LED or the laser has a wide scanning angle with reduced change in resolution, compared with a scanning optical system used for a conventional radar using TOF, and thus, the distance measurement device having an effective wide angle of view can be provided.

The laser radar has a light source for emitting light to an object, the above-mentioned mirror unit for reflecting light emitted to and reflected from the object, a lens for condensing light reflected from the mirror unit, and a light receiving element for receiving light condensed by the lens.

The present mobile body has the above-mentioned distance measurement device or laser radar. Such a mobile body includes, but is not limited to, a vehicle, a robot, a flight vehicle, a ship, or the like.

The present fixed object has the above-mentioned distance measurement device or laser radar. Such a fixed object includes, but is not limited to, a fixed object in a traffic infrastructure such as a road, a railroad, an airport, or a seaport.

Advantageous Effects of Invention

The present invention can provide the inexpensive mirror unit having reduced maintenance costs, excellent versatility, and good precision, the distance measurement device and the laser radar, and the mobile body and the fixed object having the mirror unit and the distance measurement device or the laser radar.

BRIEF DESCRIPTION OF DRAWINGS

FIG. 7 is a diagram illustrating a screen corresponding to a target area scanned by a laser radar LR.

DESCRIPTION OF EMBODIMENTS

Figure 1:
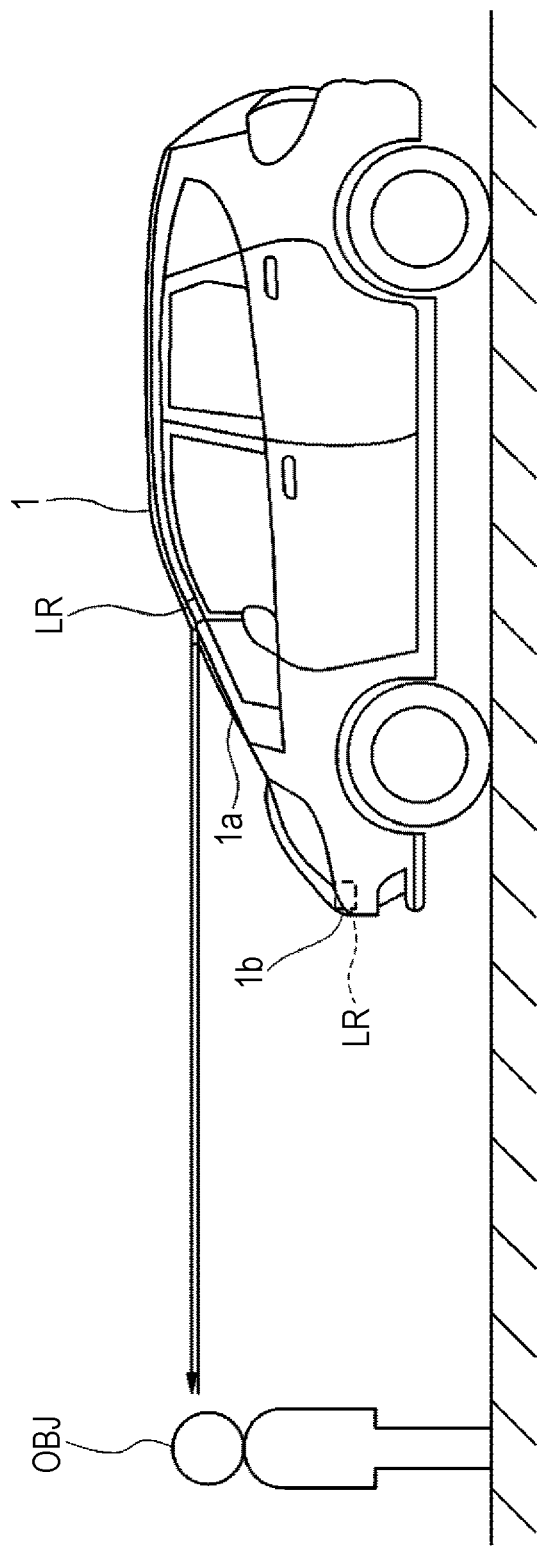
FIG. 1 is a schematic diagram illustrating a distance measurement device according to the present embodiment, being mounted on a vehicle.

Hereinafter, embodiments of the present invention will be described with reference to the drawings. FIG. 1 is a schematic diagram illustrating a laser radar as a distance measurement device according to the present embodiment, being mounted on a vehicle. However, the distance measurement device according to the present embodiment is not limited to vehicular use, and can be mounted to a mobile body, such as a robot, a flight vehicle, or a ship, or installed in a fixed object in a traffic infrastructure, such as a road or a railroad. The laser radar LR according to the present embodiment is provided behind a windshield 1a or a front grille 1b of the vehicle 1.

(First Embodiment)

Figure 2:
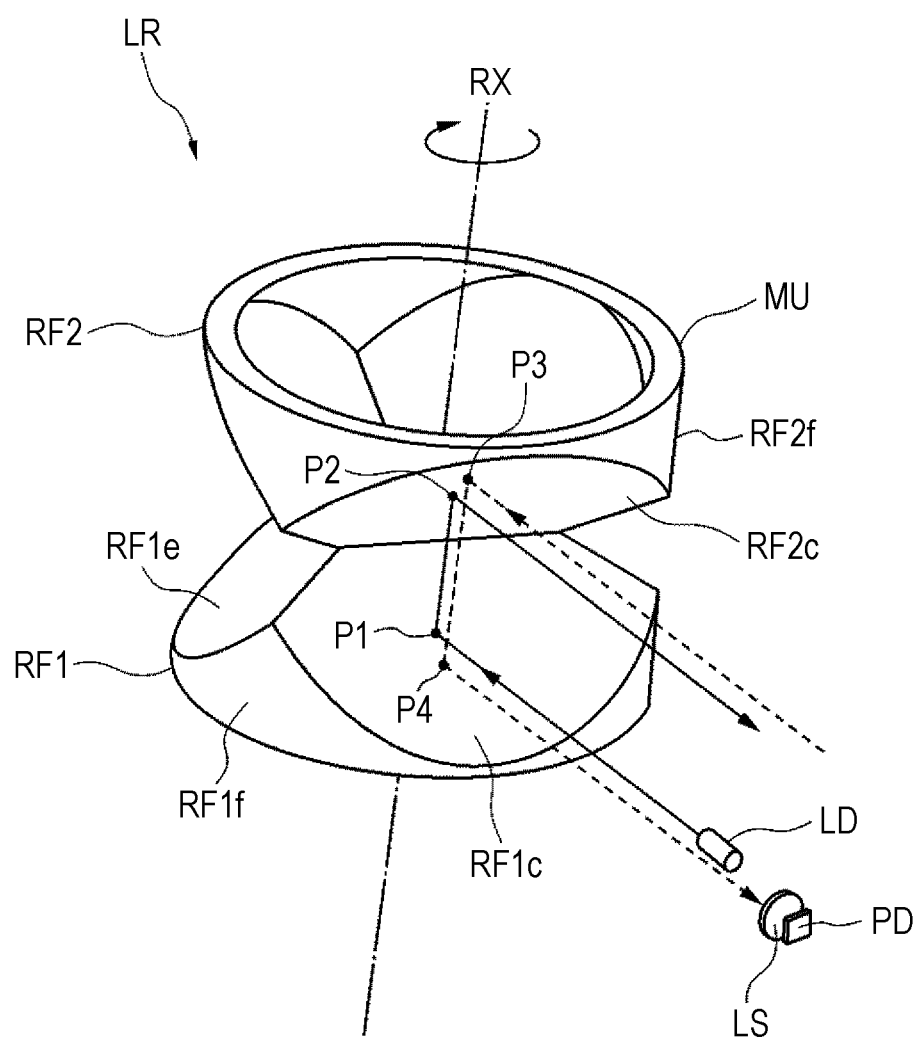
FIG. 2 is a diagram illustrating a schematic configuration of a laser radar LR according to a first embodiment.
Figure 3:
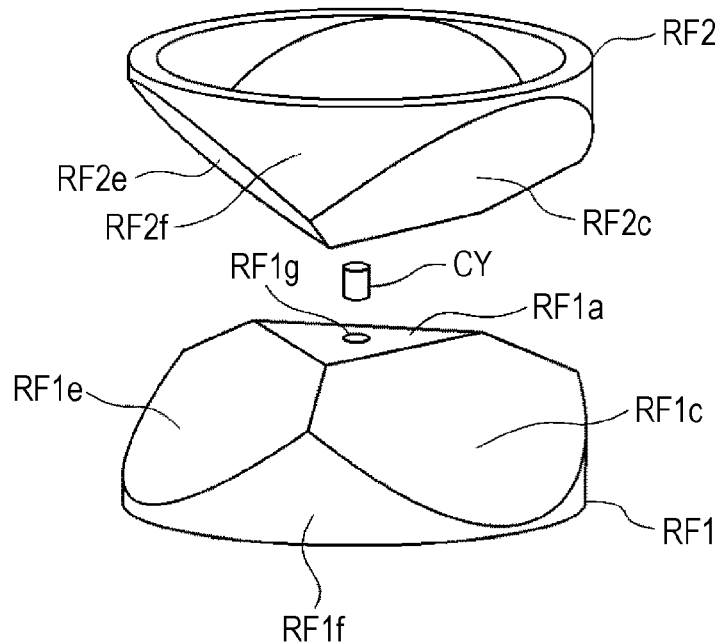
FIG. 3 is an exploded view of a mirror unit MU used for the laser radar LR.
Figure 4:
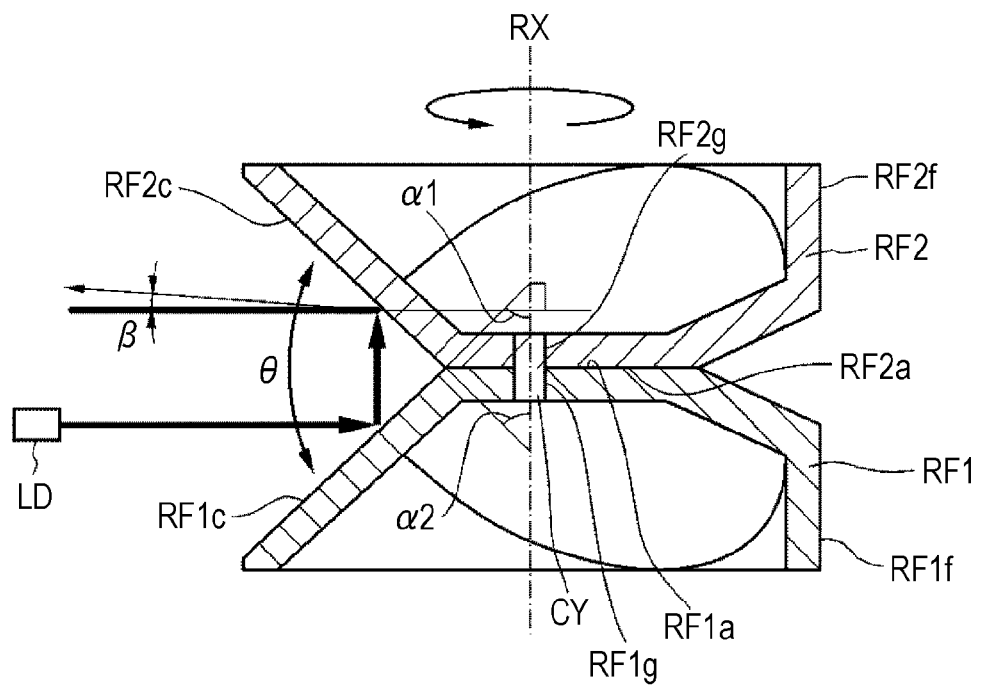
FIG. 4 is a cross-sectional view of the mirror unit MU, taken along a cross-section passing through a rotation axis.
Figure 5A:
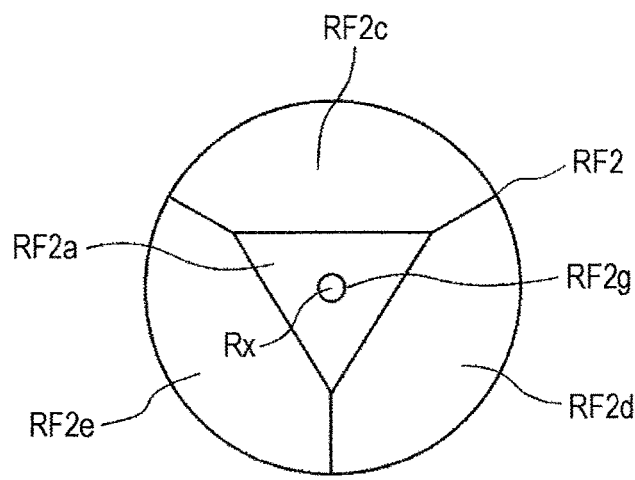
FIG. 5A is a diagram of a second reflecting member of the mirror unit MU, viewed in a rotation axis direction.
Figure 5B:
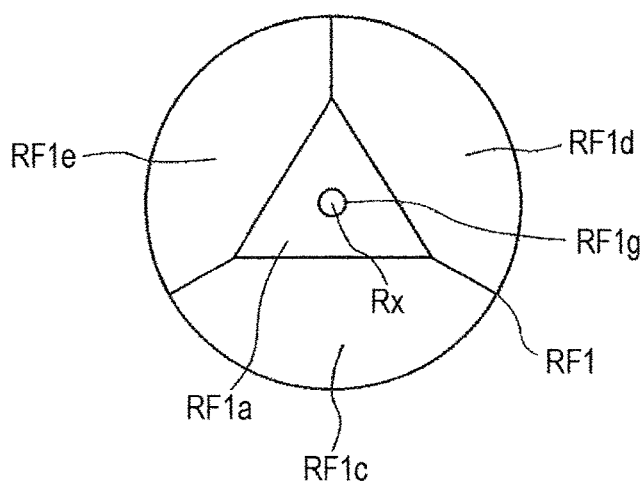
FIG. 5B is a diagram of a first reflecting member of the mirror unit MU, viewed in the rotation axis direction.
Figure 6A:
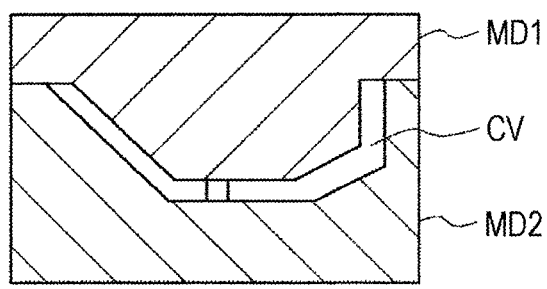
FIGS. 6A and 6B are diagrams illustrating processes of forming a component of the mirror unit MU.
Figure 6B:
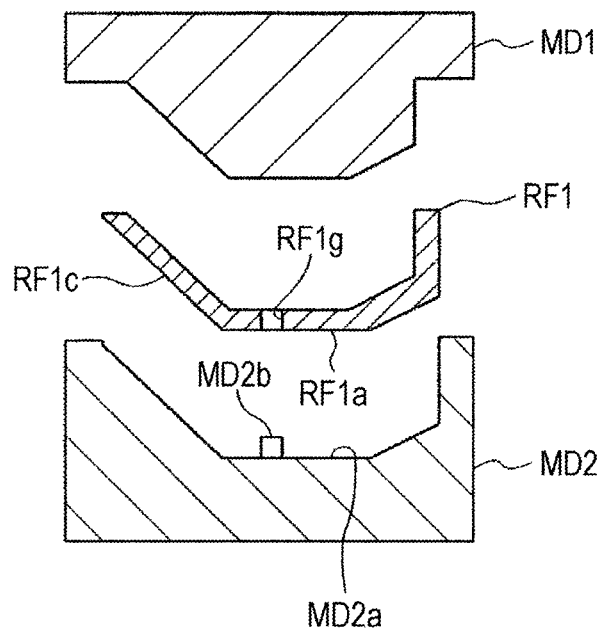

FIG. 2 is a diagram illustrating a schematic configuration of the laser LR according to a first embodiment. FIG. 3 is an exploded view of a mirror unit MU used for the laser LR, and FIG. 4 is a cross-sectional view of the mirror unit MU, taken along a cross-section passing through a rotation axis. FIG. 5A is a diagram of a second reflecting member of the mirror unit MU, viewed in a rotation axis direction, and FIG. 5B is a diagram of a first reflecting member of the mirror unit MU, viewed in the rotation axis direction. FIGS. 6A and 6B are diagrams illustrating a process of forming a component of the mirror unit MU.

In FIG. 2, the laser radar LR has for example a pulsing laser diode LD (including collimator lens), the mirror unit MU, a lens LS, and a photodiode PD. The pulsing laser diode LD (including collimator lens) emits a laser beam, the mirror unit MU has rotating reflecting surfaces each scanning light emitted from the laser diode LD as a light source, over an object OBJ (FIG. 1), and reflecting light reflected from the scanned object OBJ, the lens LS condenses the light reflected from the object OBJ which is further reflected from the mirror unit MU, and the photodiode PD receives the light condensed by the lens LS.

The laser diode LD constitutes a light emission system, and the lens LS and the photodiode PD constitute a light reception system. The beam emitted from the laser diode LD is preferably longer in a sub-scanning angle direction than in a scanning angle direction, within a measurement range of the object. Preferably, the light emission system and the light reception system preferably have optical axes orthogonal to the rotation axis RX of the mirror unit MU, and the light emission system is disposed away from the light reception system in a rotation axis RX, toward the center of the mirror unit MU. The optical axes of the light emission system and the light reception system may be slightly inclined relative to a direction orthogonal to the rotation axis, depending on a size or shape of the device, disposition of optical elements, or the like.

The mirror unit MU is held by a casing, not illustrated, to be rotated about the rotation axis RX, and includes a combination of the first reflecting member RF1 and the second reflecting member RF2. The first reflecting member RF1 made of resin and having a thick cup shape has, on an outside surface, an equilateral-triangular bottom surface RF1a about the rotation axis RX, three substantially fan-shaped reflecting surfaces (first reflecting surfaces) RF1c, RF1d, and RF1e crossing respective sides of the bottom surface RF1a, and a cylindrical outer peripheral surface RF1f (FIG. 3) making contact with the reflecting surfaces, with reference to FIG. 5B. At the center of the bottom surface RF1a, a center opening RF1g is formed.

The second reflecting member RF2 is made of resin and has a thick cup shape, as similar to the first reflecting member RF1, and the second reflecting member RF2 has, on an outside surface, an equilateral-triangular bottom surface RF2a about the rotation axis RX, three substantially fan-shaped reflecting surfaces (second reflecting surfaces) RF2c, RF2d, and RF2e crossing respective sides of the bottom surface RF2a, and a cylindrical outer peripheral surface RF2f (FIG. 3) making contact with the reflecting surfaces, with reference to FIG. 5A. At the center of the bottom surface RF2a, a center opening RF2g is formed.

Here, an inclination angle $\alpha 1$ of the reflecting surface RF1c is 44° relative to the rotation axis RX, an inclination angle $\alpha 1$ of the reflecting surface RF1d is 45° relative to the rotation axis RX, and an inclination angle $\alpha 1$ of the reflecting surface RF1e is 46° relative to the rotation axis RX. In contrast, an inclination angle $\alpha 2$ of the reflecting surface RF2c is 44° relative to the rotation axis RX, an inclination angle $\alpha 2$ of the reflecting surface RF2d is 45° relative to the rotation axis RX, and an inclination angle $\alpha 2$ of the reflecting surface RF2e is 46° relative to the rotation axis RX.

A process of manufacturing the first reflecting member RF1 is described. In FIG. 6A, a resin is filled in a cavity CV formed by clamping an upper mold MD1 and a lower mold MD2, and after the resin is hardened, the molds are opened to release the first reflecting member RF1, as illustrated in FIG. 6B. Then, a film is formed over the surface of the first reflecting member RF1 by vapor deposition or the like of aluminum, gold, silver, or the like, and the reflecting surfaces RF1c, RF1d, and RF1e can be obtained.

When the inclination angle is changed relative to the rotation axis RX between the reflecting surfaces RF1c, RF1d, and RF1e, as described in the present embodiment, advantageously, the first reflecting member RF1 can be accurately formed with a mold. Specifically, the lower mold MD2 has a single transfer surface MD2a, and the transfer surface MD2a can form the bottom surface RF1a and the three reflecting surfaces RF1c, RF1d, and RF1e of the first reflecting member RF1 so that the inclination angles of the reflecting surfaces RF1c, RF1d, and RF1e relative to the bottom surface RF1a can be precisely maintained. Furthermore, a projection MD2b for forming the center opening RF1g is formed in the transfer surface MD2a for transferring the bottom surface RF1a, so that precise squareness between the bottom surface RF1a and an axis of the center opening RF1g can be maintained. In addition, the second reflecting member RF2 can be also molded through a similar process.

Furthermore, since the first reflecting member RF1 is molded in a mold, the mold is reduced in size and capital cost is reduced, and further, since the paired reflecting surfaces are separately formed, the film can be readily formed over the reflecting surface. The same is true on the second reflecting member RF2.

As illustrated in FIGS. 3 and 4, the first reflecting member RF1 and the second reflecting member RF2 are assembled by opposing the bottom surfaces RF1a and RF2a, inserting both ends of a cylindrical member CY into the center openings RF1g and RF2g, respectively, and closely fitting the bottom surfaces to each other. As described above, the first reflecting member RF1 and the second reflecting member RF2, which are precisely formed by molding, can be guided by the cylindrical member CY inserted into the center openings RF1g and RF2g, and coaxially assembled to each other. When three minute projections having the same height are provided on the bottom surface RF1a of the first reflecting member RF1 or the bottom surface RF2a of the second reflecting member RF2 so that the bottom surfaces RF1a and RF2a are brought into contact with each other at three points of the minute projections, the bottom surfaces RF1a and RF2a can be readily positioned parallel to each other, and the first reflecting member RF1 and the second reflecting member RF2 can be assembled to have an appropriate attitude.

During assembly, the reflecting surface RF1c and the reflecting surface RF2c are opposed in pairs, the reflecting surface RF1d and the reflecting surface RF2d are opposed in pairs, the reflecting surface RF1e and the reflecting surface RF2e are opposed in pairs, and a phase in a rotation direction is set.

Next, distance measurement operation of the laser radar LR is described. In FIG. 2, while the mirror unit MU is driven by a drive source, not illustrated, to be rotated at a constant speed, light intermittently emitted from the laser diode LD is incident on a point P1 on the reflecting surface RF1c of the first reflecting member RF1 and reflected from the point P1, travels along the rotation axis RX or travels while being inclined at a predetermined angle relative to the rotation axis RX, is further reflected from a point P2 on the reflecting surface RF2c of the second reflecting member RF2, and scanned toward the object OBJ. At this time, the points P1 and P2 are circumferentially moved on the respective reflecting surfaces, according to the rotation of the mirror unit MU. Then, the points P1 and P2 are relatively moved onto the reflecting surfaces RF1d and RF2d by the rotation of the mirror unit MU, and further relatively moved onto the reflecting surfaces RF1e and RF2e by the rotation of the mirror unit MU.

FIG. 7 is a diagram illustrating a state in which the emitted laser spot beam SB (hatched) is scanned over a screen G being a detection range of the laser radar LR, according to the rotation of the mirror unit MU. Here, the reflecting surfaces of the mirror unit MU have different inclination angles relative to the rotation axis RX, as described above.

Therefore, the laser beam reflected on the pair of the reflecting surfaces RF1c and RF2c is scanned over an area Ln1 at the top of the screen G, from the left side to the right side in a horizontal direction, according to the rotation of the mirror unit MU. Next, the laser beam reflected on the pair of the reflecting surfaces RF1d and RF2d is scanned over an area Ln2 positioned second from the top of the screen G, from the left side to the right side in a horizontal direction, according to the rotation of the mirror unit MU. Then, the laser beam reflected on the pair of the reflecting surfaces RF1e and RF2e is scanned over an area Ln3 positioned third from the top of the screen G, from the left side to the right side in a horizontal direction, according to the rotation of the mirror unit MU. Thus, scanning over one screen is completed. Then, after the mirror unit MU completes one rotation, the pair of the reflecting surfaces RF1c and RF2c returns, and scanning is repeated again from the top of the screen G. Note that when the pairs have different crossing angles other than 90 degrees, light emitting timing of the laser beam emitted to a pair having a crossing angle far from 90 degrees is preferably delayed relative to light emitting timing of the laser beam emitted to a pair having a crossing angle close to 90 degrees.

In FIG. 2, laser beams reflected from the object OBJ of beams emitted for scanning are incident again on the reflecting surface RF2c or the like of the second reflecting member RF2 and reflected from the reflecting surface RF2c or the like, travel along the rotation axis RX or travel while being inclined at a predetermined angle relative to the rotation axis RX, are further reflected from the reflecting surface RF1c or the like of the first reflecting member RF1, are condensed by the lens LS, and detected on a light receiving surface of the photodiode PD. Thus, the object OBJ can be detected within the whole range over the screen G.

Table 1 shows an exemplary specification of the mirror unit MU according to the embodiment described above (inclination angle α1 of each reflecting surface of the first reflecting member relative to the rotation axis, inclination angle α2 of each reflecting surface of the second reflecting member relative to the rotation axis, relative reflection angle θ, beam emission angle β). Here, the relative reflection angle θ represents a crossing angle between a pair of the reflecting surfaces of the first reflecting member RF1 and the second reflecting member RF2, and the beam emission angle represents an angle of light emitted from the mirror unit MU relative to a plane orthogonal to the rotation axis RX of the mirror unit MU, defining the angle directed upward in a direction of gravitational acceleration as +, and the angle directed downward as −, with reference to FIG. 4. As shown in Table 1, use of three pairs of reflecting surfaces can provide three kinds of beam emission angles of −4°, 0°, and +4°. The above features are defined as a basic specification.

TABLE 1

BASIC SPECIFICATION

| COMBINATION | RF1c/RF2c | RF1d/RF2d | RF1e/RF2e (°) |
|---|---|---|---|
| FIRST REFLECTING MEMBER, INCLINATION ANGLE α1 | 44 | 45 | 46 |
| SECOND REFLECTING MEMBER, INCLINATION ANGLE α2 | 44 | 45 | 46 |
| RELATIVE REFLECTION ANGLE θ | 88 | 90 | 92 |
| BEAM EMISSION ANGLE β | −4 | 0 | +4 |

Figure 8:
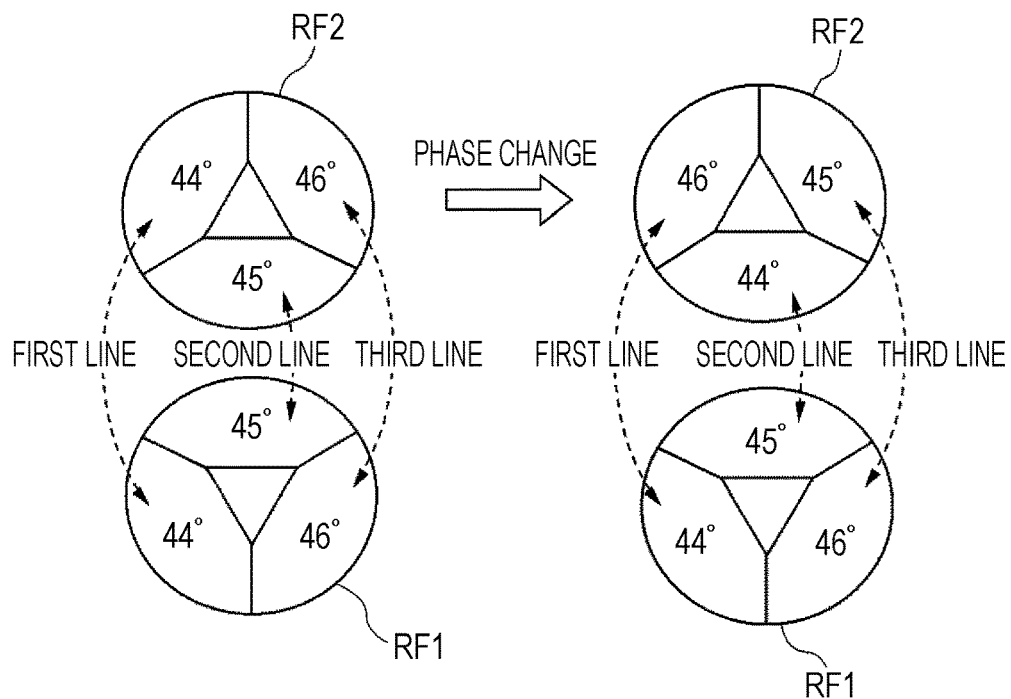
FIG. 8 is a diagram illustrating a relationship between a pair of reflecting surfaces upon changing a rotational phase.

Table 2 shows a first modified specification of a rotational phase obtained by shifting the first reflecting member RF1 and the second reflecting member RF2 clockwise by 120°, relative to the above-mentioned basic specification, as schematically illustrated in FIG. 8. In such modification, preferably, the first reflecting member RF1 and the second reflecting member RF2 are relatively turned about the cylindrical member CY. Thus, the reflecting surface RF1c of the first reflecting member RF1 is paired with the reflecting surface RF2e of the second reflecting member RF2, the reflecting surface RF1d is paired with the reflecting surface RF2c, and further, the reflecting surface RF1e is paired with the reflecting surface RF2d. As described above, the combination of the pairs of the reflecting surfaces can be changed to change the relative reflection angle θ and the beam emission angle β, as shown in Table 2. According to the first modified specification, three kinds of beam emission angles of 0°, −2°, and +2° can be obtained.

TABLE 2

CLOCKWISE SHIFTED PHASE

| COMBINATION | RF1c/RF2e | RF1d/RF2c | RF1e/RF2d (°) |
|---|---|---|---|
| FIRST REFLECTING MEMBER, INCLINATION ANGLE α1 | 44 | 45 | 46 |
| SECOND REFLECTING MEMBER, INCLINATION ANGLE α2 | 46 | 44 | 45 |
| RELATIVE REFLECTION ANGLE θ | 90 | 89 | 91 |
| BEAM EMISSION ANGLE β | 0 | −2 | +2 |

Table 3 shows a second modified specification of a rotational phase obtained by shifting the first reflecting member RF1 and the second reflecting member RF2 counterclockwise by 120°, relative to the above-mentioned basic specification. In such modification, preferably, the first reflecting member RF1 and the second reflecting member RF2 are relatively turned about the cylindrical member CY, in the reverse direction. Thus, the reflecting surface RF1c of the first reflecting member RF1 is paired with the reflecting surface RF2d of the second reflecting member RF2, the reflecting surface RF1d is paired with the reflecting surface RF2e, and further, the reflecting surface RF1e is paired with the reflecting surface RF2c. As described above, the combination of the pairs of the reflecting surfaces can be changed to change the relative reflection angle θ and the beam emission angle β, as shown in Table 3. According to the second modified specification, three kinds of beam emission angles of −2°, +2°, and +0° can be obtained. Thus, the position of the laser spot beam SB passing through the screen (FIG. 7) can be changed.

TABLE 3

COUNTERCLOCKWISE SHIFTED PHASE

| COMBINATION | RF1c/RF2d | RF1d/RF2e | RF1e/RF2c (°) |
|---|---|---|---|
| FIRST REFLECTING MEMBER, INCLINATION ANGLE α1 | 44 | 45 | 46 |
| SECOND REFLECTING MEMBER, INCLINATION ANGLE α2 | 45 | 46 | 44 |
| RELATIVE REFLECTION ANGLE θ | 89 | 91 | 90 |
| BEAM EMISSION ANGLE β | −2 | +2 | 0 |

As described above, the mirror unit MU according to the present embodiment is only required to change the combination of the first reflecting member RF and the second reflecting member RF2 having the same shape to change the kinds of beam emission angles, so that the same component can be used for the laser radars LR having different specifications, for excellent versatility.

(Modification)

As a modification of the present embodiment, the combination may employ a first reflecting member RF1 having three reflecting surfaces RF1c, RF1d, and RF1e having equal inclination angles relative to the rotation axis RX, in replacement of the first reflecting member RF1 according to the present embodiment. Table 4 shows an exemplary specification of this configuration, but this exemplary specification is similar to the above-mentioned embodiment, excluding fixation of the reflecting surfaces RF1c, RF1d, and RF1e at an inclination angle of 45°. As shown in Table 4, use of the three pairs of reflecting surfaces can provide three kinds of beam emission angles of −2°, 0°, and +2°. When the beam emission angle is desired to be changed, a second reflecting member RF2 having reflecting surfaces RF2c, RF2d, and RF2e having different inclination angles is preferably employed. According to the present example, the combination of the first reflecting member and the second reflecting member can be changed to readily change the beam emission angle, for increased versatility to various distance measurement devices. Furthermore, cost of the mold for molding the first reflecting member RF1 can be reduced. The first reflecting member RF1 according to the present embodiment may be combined with a second reflecting member RF2 having three reflecting surfaces RF2c, RF2d, and RF2e having equal inclination angles relative to the rotation axis RX.

TABLE 4

MODIFICATION

| COMBINATION | RF1c/RF2c | RF1d/RF2d | RF1e/RF2e (°) |
|---|---|---|---|
| FIRST REFLECTING MEMBER, INCLINATION ANGLE α1 | 45 | 45 | 45 |
| SECOND REFLECTING MEMBER, INCLINATION ANGLE α2 | 44 | 45 | 46 |
| RELATIVE REFLECTION ANGLE θ | 89 | 90 | 91 |
| BEAM EMISSION ANGLE β | −2 | 0 | +2 |

(Second Embodiment)

Figure 9:
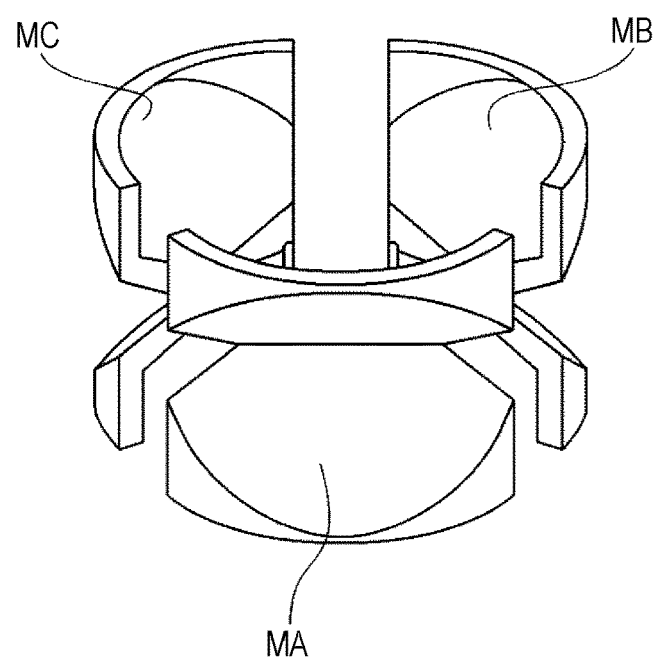
FIG. 9 is an exploded view of a mirror unit MU according to a second embodiment.
Figure 10:
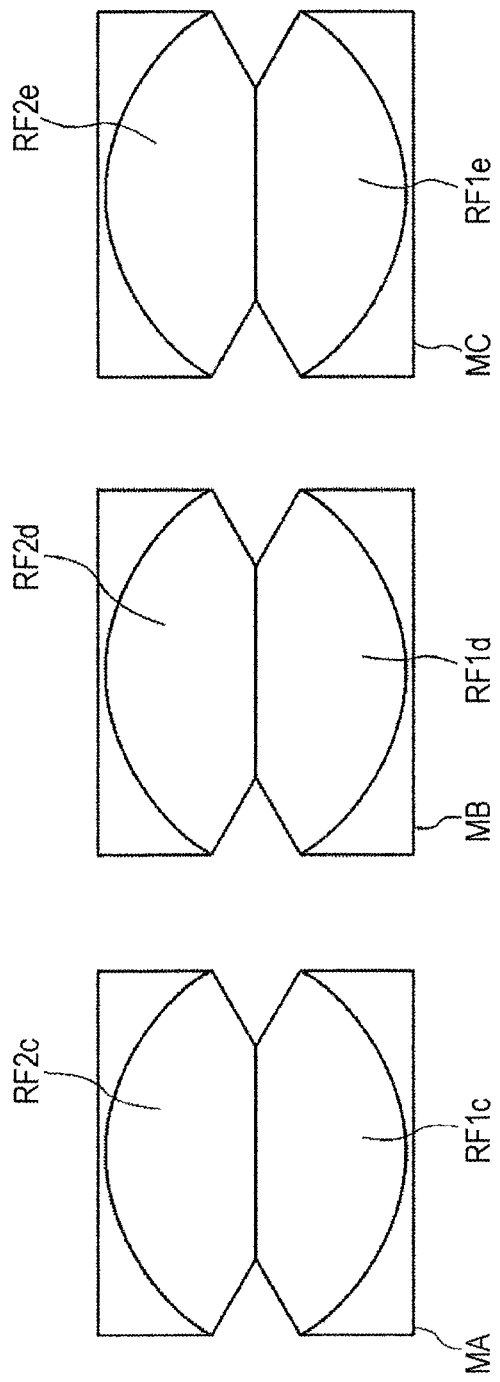
FIGS. 10A, 10B and 10C are diagrams illustrating components of the mirror unit MU according to the second embodiment, viewed radially from the outside.
Figure 11:
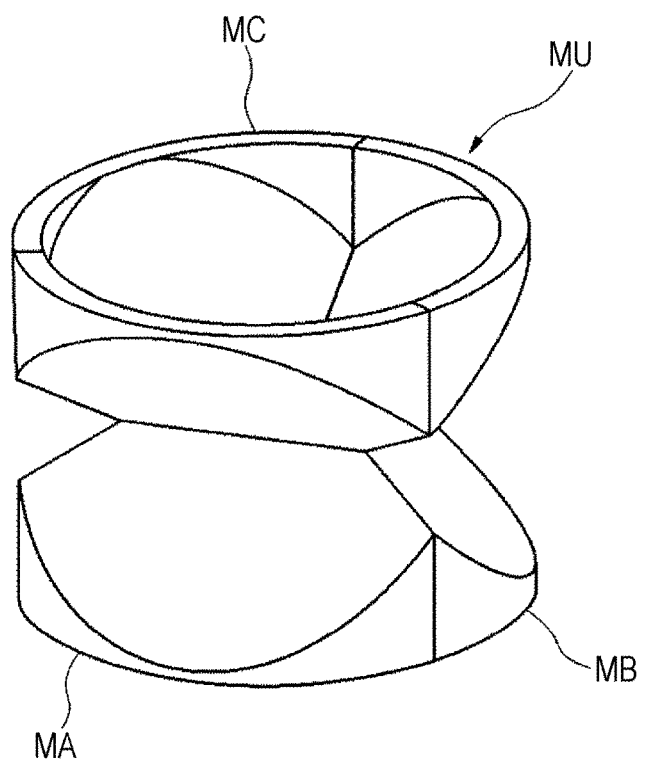
FIG. 11 is an assembly diagram of the mirror unit MU according to the second embodiment.

FIG. 9 is an exploded view of a mirror unit MU according to a second embodiment, FIG. 10 is a diagram illustrating components of the mirror unit MU according to the second embodiment, viewed radially from the outside, and FIG. 11 is an assembly diagram of the mirror unit MU according to the second embodiment.

The mirror unit MU according to the present embodiment has a configuration divided into three parts by dividing planes parallel to the rotation axis, includes a first component MA, a second component MB, and a third component MC, and the components are molded in molds not illustrated. The first component MA has a pair of the reflecting surfaces RF1c RF2c, as illustrated in FIG. 10A. The second component MB has a pair of the reflecting surfaces RF1d and RF2d, as illustrated in FIG. 10B. The third component MC has a pair of the reflecting surfaces RF1e and RF2e, as illustrated in FIG. 10C.

The first component MA, the second component MB, and the third component MC each have side surfaces on which an adhesive is applied, the side surfaces are bonded to each other to obtain the mirror unit MU being rotationally symmetric, as illustrated in FIG. 11. The mirror unit MU being assembled has a shape the same as that of the first embodiment, and can be used for the laser radar LR. According to the present embodiment, a molding process using a mold can maintain precise angles (relative reflection angles) between the pairs of reflecting surfaces, and the mirror unit can be used for a specification demanding a precise relative reflection angle.

(Third Embodiment)

Figure 12:
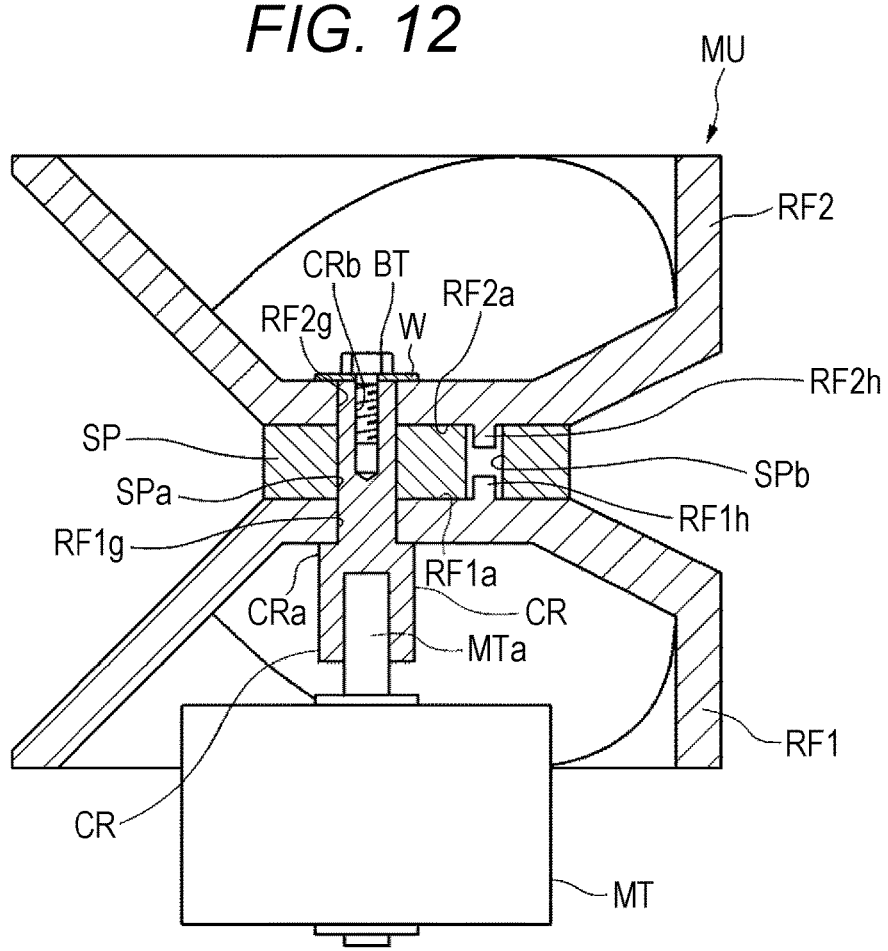
FIG. 12 is a cross-sectional view illustrating a third embodiment, similar to the cross-sectional view of FIG. 4.
Figure 13:
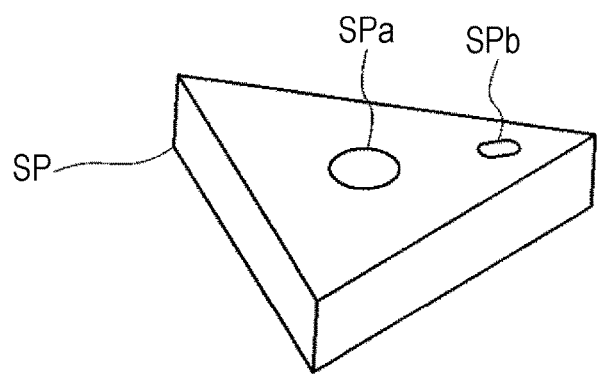
FIG. 13 is a perspective view of a spacer SP used in the present embodiment.

FIG. 12 is a cross-sectional view illustrating a third embodiment, similar to the cross-sectional view of FIG. 4. FIG. 13 is a perspective view of a spacer SP used in the present embodiment. The first reflecting member RF1 and the second reflecting member RF2 according to the present embodiment have a basic configuration including the reflecting surfaces, and the basic configuration is similar to those of the first embodiment. However, cylindrical bosses RF1h and RF2h are oppositely formed on the bottom surfaces RF1a and RF2a.

As illustrated in FIG. 13, the spacer SP is an equilateral-triangular plate substantially fitting the bottom surfaces RF1a and RF2a of the first reflecting member RF1 and the second reflecting member RF2, has a center circular opening SPa, and a long hole SPb penetratingly extending in a radial direction, adjacent to the circular opening SPa.

In FIG. 12, during assembly, the spacer SP is disposed between the first reflecting member RF1 and the second reflecting member RF2 to make close contact with the bottom surfaces RF1a and RF2a. In this state, the cylindrical bosses RF1h and RF2h are inserted into the long hole SPb from both sides. The cylindrical bosses RF1h and RF2h being inserted into the long hole SPb does not rattle in a rotation direction, and pairs of reflecting surfaces of the first reflecting member RF1 and the second reflecting member RF2 can be precisely positioned. However, a gap is provided between the cylindrical bosses RF1h and RF2h and the long hole SPb, in a radial direction, minute positional adjustment is allowed, and the first reflecting member RF1 and the second reflecting member RF2, and the spacer SP can be readily assembled.

Furthermore, while the spacer SP is positioned between the first reflecting member RF1 and the second reflecting member RF2, a cylindrical connection rod CR is inserted into the center opening RF1g of the first reflecting member RF1, the circular opening SPa of the spacer SP, and the center opening RF2g of the second reflecting member RF2. A large diameter portion CRa is formed on the lower end side of the connection rod CR, and brought into contact with the circumference of the center opening RF1g. In contrast, a screw hole CRb is formed at an upper end of the connection rod CR, a bolt BT is threaded into the screw hole CRb through a washer W, a tensile force is applied to the connection rod CR between the washer W and the large diameter portion CRa, thereby the spacer SP is fixed between the first reflecting member RF1 and the second reflecting member RF2, and thus, the mirror unit MU is completed. The first reflecting member RF1, the second reflecting member RF2, and the spacer SP may be fixed to each other with an adhesive.

Furthermore, a drive shaft MTa of a motor MT is fixedly press-fitted into a hollow lower end of the connection rod CR. Power is fed to the motor MT to rotate the connection rod CR through the drive shaft MTa, and the mirror unit MU can be rotated.

According to the present embodiment, change in thickness of the spacer SP allows precise setting of an interval between the pairs of reflecting surfaces of the first reflecting member RF1 and the second reflecting member RF2, so that beam vignetting can be avoided, for example when a wide sub-scanning angle is required, and thus, a flexible response can be made to optical systems or case sizes of laser radars LR. The first reflecting member RF1 or the second reflecting member RF2 may be previously molded integrally with a spacer SP having an arbitrary thickness.

(Fourth Embodiment)

Figure 14:
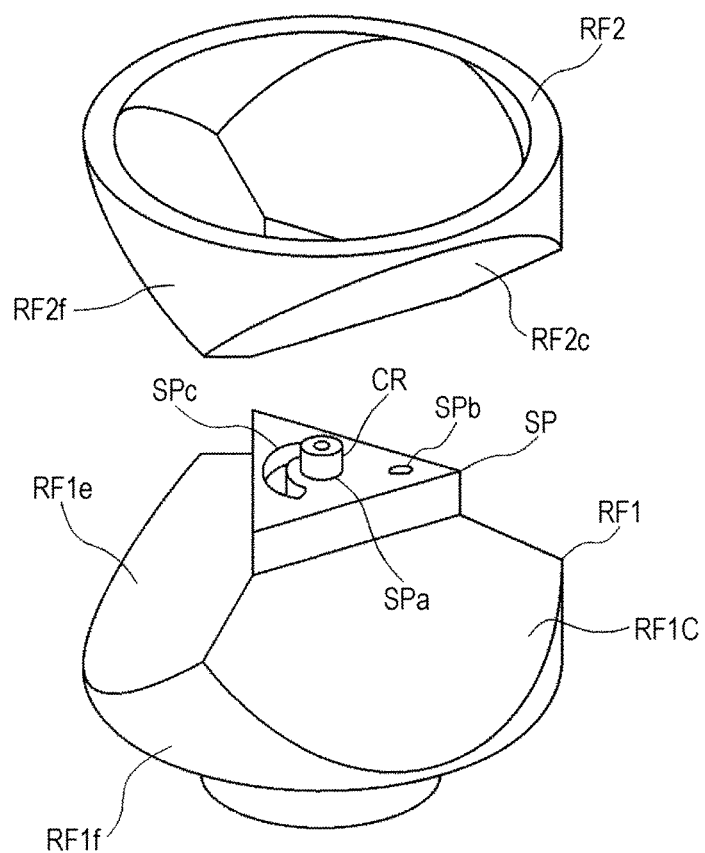
FIG. 14 is an exploded view of a mirror unit MU according to a fourth embodiment.
Figure 15:
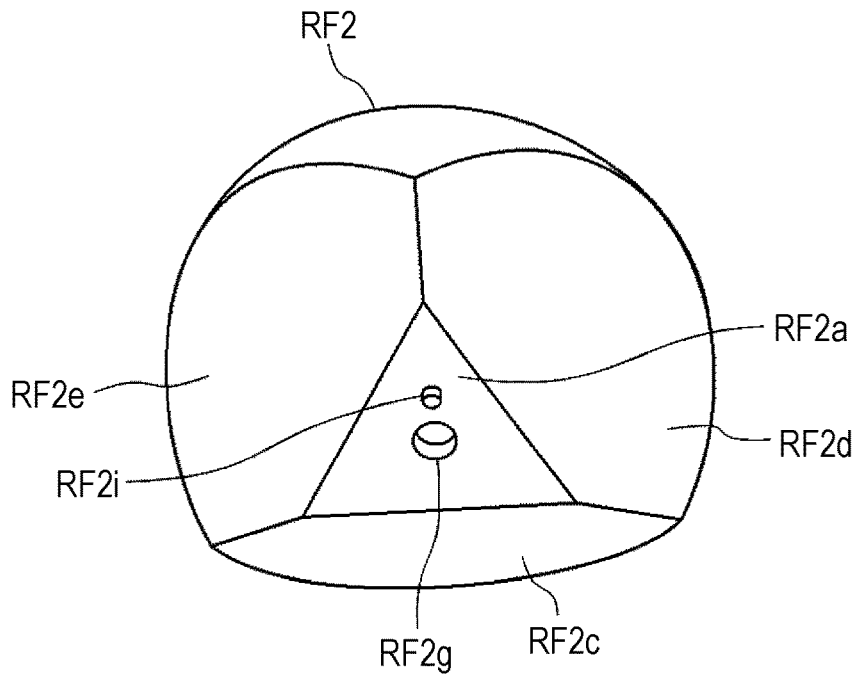
FIG. 15 is a perspective view of a second reflecting member RF2 according to the present embodiment.
Figure 16:
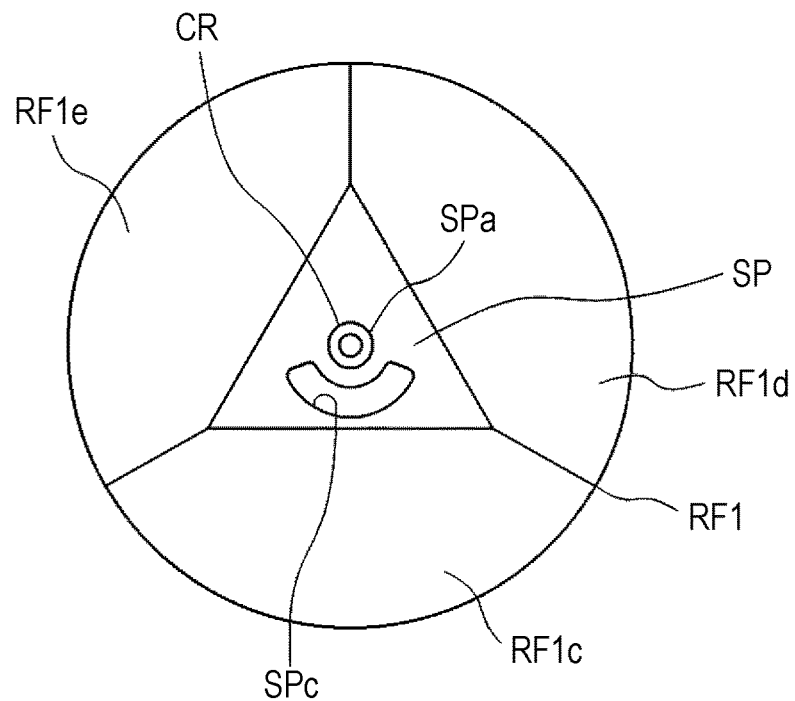
FIG. 16 is a perspective view of a first reflecting member RF1 according to the present embodiment.
Figure 17:
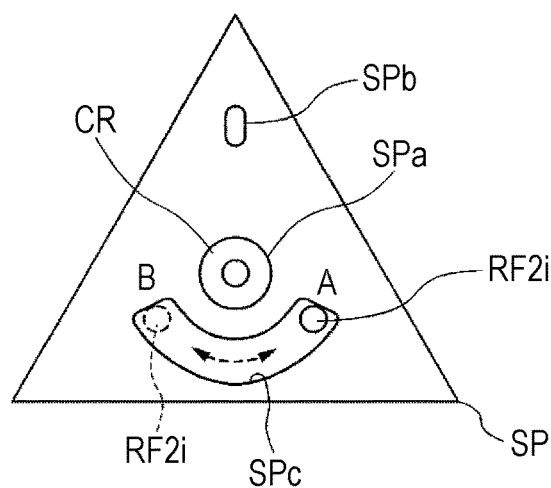
FIG. 17 is a diagram of a spacer SP, viewed in a rotation axis direction.
Figure 18:
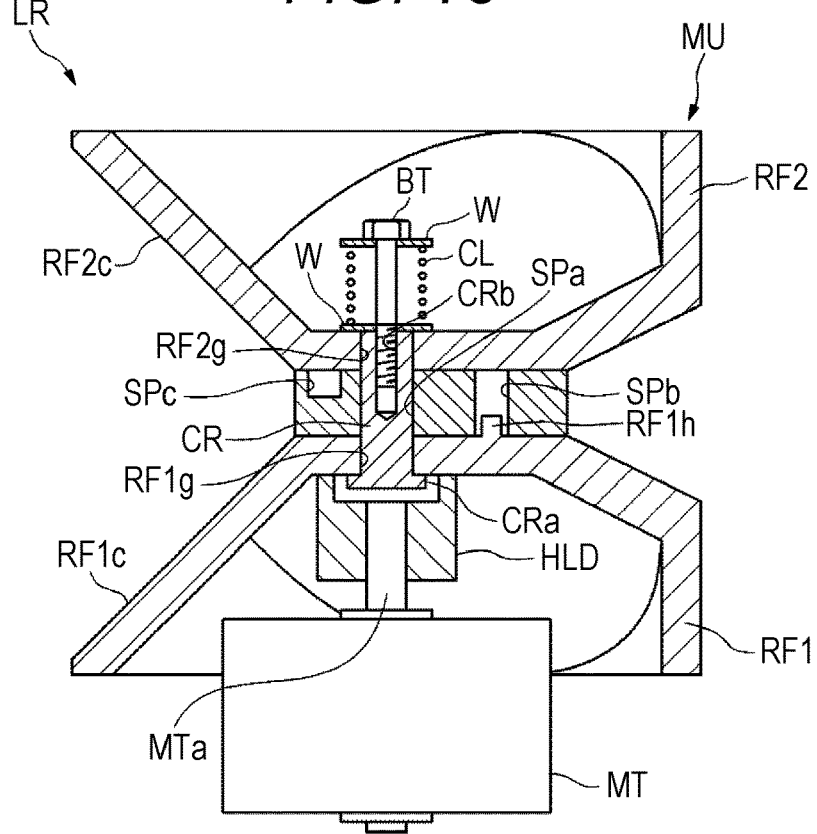
FIG. 18 is a cross-sectional view illustrating a fourth embodiment, similar to the cross-sectional view of FIG. 4.

FIG. 14 is an exploded view of a mirror unit MU according to a fourth embodiment, FIG. 15 is a perspective view of a second reflecting member RF2 according to the present embodiment, FIG. 16 is a perspective view of a first reflecting member RF1 according to the present embodiment, FIG. 17 is a diagram of a spacer SP, viewed in a rotation axis direction, and FIG. 18 is a cross-sectional view illustrating the fourth embodiment, similar to the cross-sectional view of FIG. 4.

In the present embodiment, the spacer SP is employed similar to the third embodiment, but as illustrated in FIG. 18, the spacer SP is previously bonded to the first reflecting member RF1, while the cylindrical boss RF1h and the long hole SPb are engaged with each other. The spacer SP further forms an arcuate groove SPc around a center opening SPa. In contrast, the second reflecting member RF2 forms a projection RF2i (FIG. 15) on the bottom surface RF1a.

During assembly, when the second reflecting member RF2 is assembled to the spacer SP bonded to the first reflecting member RF1, the projection RF2i is engaged with the arcuate groove SPc. Here, as indicated by a solid line in FIG. 17, a state (A) in which the projection RF2i is in contact with one end portion of the arcuate groove SPc represents the basic specification shown in Table 1, and as indicated by a dotted line, a state (B) in which the projection RF2i is in contact with the other end portion of the arcuate groove SPc represents the first modified specification shown in Table 2.

Furthermore, as illustrated in FIG. 18, the cylindrical connection rod CR is inserted into the center opening RF1g of the first reflecting member RF1, the circular opening SPa of the spacer SP, and the center opening RF2g of the second reflecting member RF2. The large diameter portion CRa is formed on the lower end side of the connection rod CR, and brought into contact with the circumference of the center opening RF1g. In contrast, only an end of the bolt BT is threaded into the screw hole CRb formed at the upper end of the connection rod CR, but a coil spring CL is disposed between two washers W mounted on the bolt BT to generate an urging force to apply a predetermined axial force to the bolt BT, thereby a tensile force is applied to the connection rod CR between a washer W on the lower side and the large diameter portion CRa, and the first reflecting member RF1 and the second reflecting member RF2 can be integrally fixed while fixing the spacer SP between the first and second reflecting members RF1 and RF2.

In the present embodiment, the connection rod CR is not connected to the motor MT. Instead, the drive shaft MTa of the motor MT is fixedly connected to the first reflecting member RF1 through a holder HLD.

While the mirror unit MU is at rest, power is fed to the motor MT to rotate the first reflecting member RF1 through the drive shaft MTa, an inertial force exceeds a frictional force of the washer W, rotation of the second reflecting member RF2 is delayed, and the projection RF2i is moved in the arcuate groove SPc according to the rotation direction of the second reflecting member RF2. Therefore, the state (A) in which the projection RF2i is in contact with the one end portion of the arcuate groove SPc can be obtained to have the basic specification shown in Table 1, and thus a desired emission angle can be obtained according to the combination.

In contrast, reverse power is supplied to the motor MT to reversely rotate the first reflecting member RF1, inertial force exceeds the frictional force of the washer W, the projection RF2i is moved in the arcuate groove SPc according to the reverse rotation, the projection RF2i is in contact with the other end portion of the arcuate groove SPc, and the state (B) can be obtained. Accordingly, the first modified specification shown in Table 2 can be obtained, and the desired emission angle can be obtained according to the combination. As described above, different emission angles can be obtained according to the rotation direction of the mirror unit MU, and thus, detection characteristics of the laser radar LR can be achieved suitably to vehicle speed, for example, a scanning range can be changed by changing the rotation direction of the mirror unit MU according to a vehicle speed.

(Fifth Embodiment)

Figure 19:
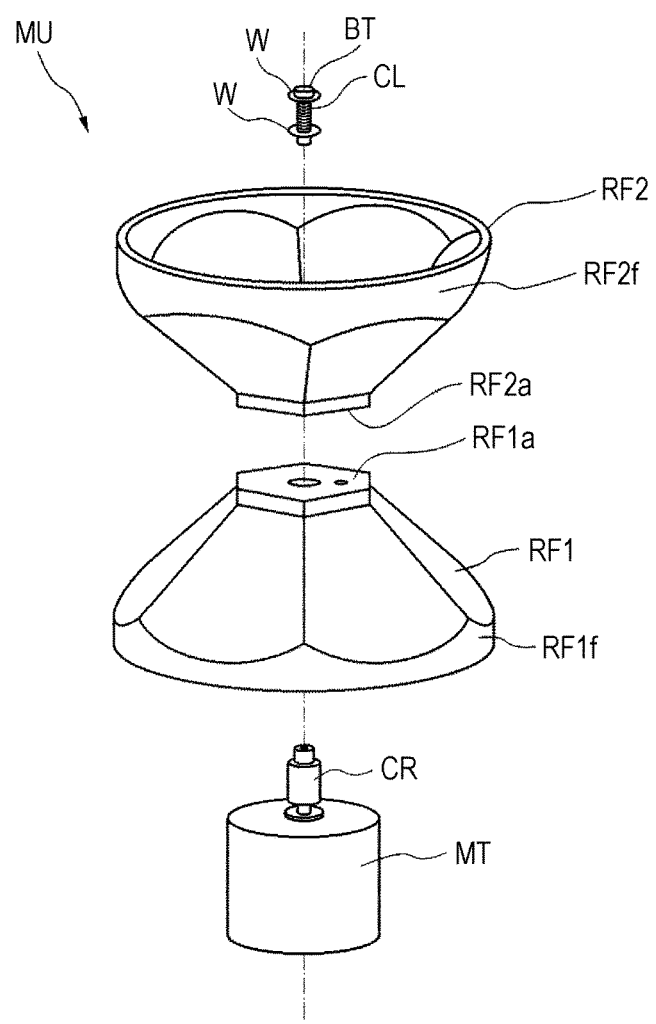
FIG. 19 is an exploded view of a mirror unit MU according to a fifth embodiment, used for the laser radar LR.
Figure 20:
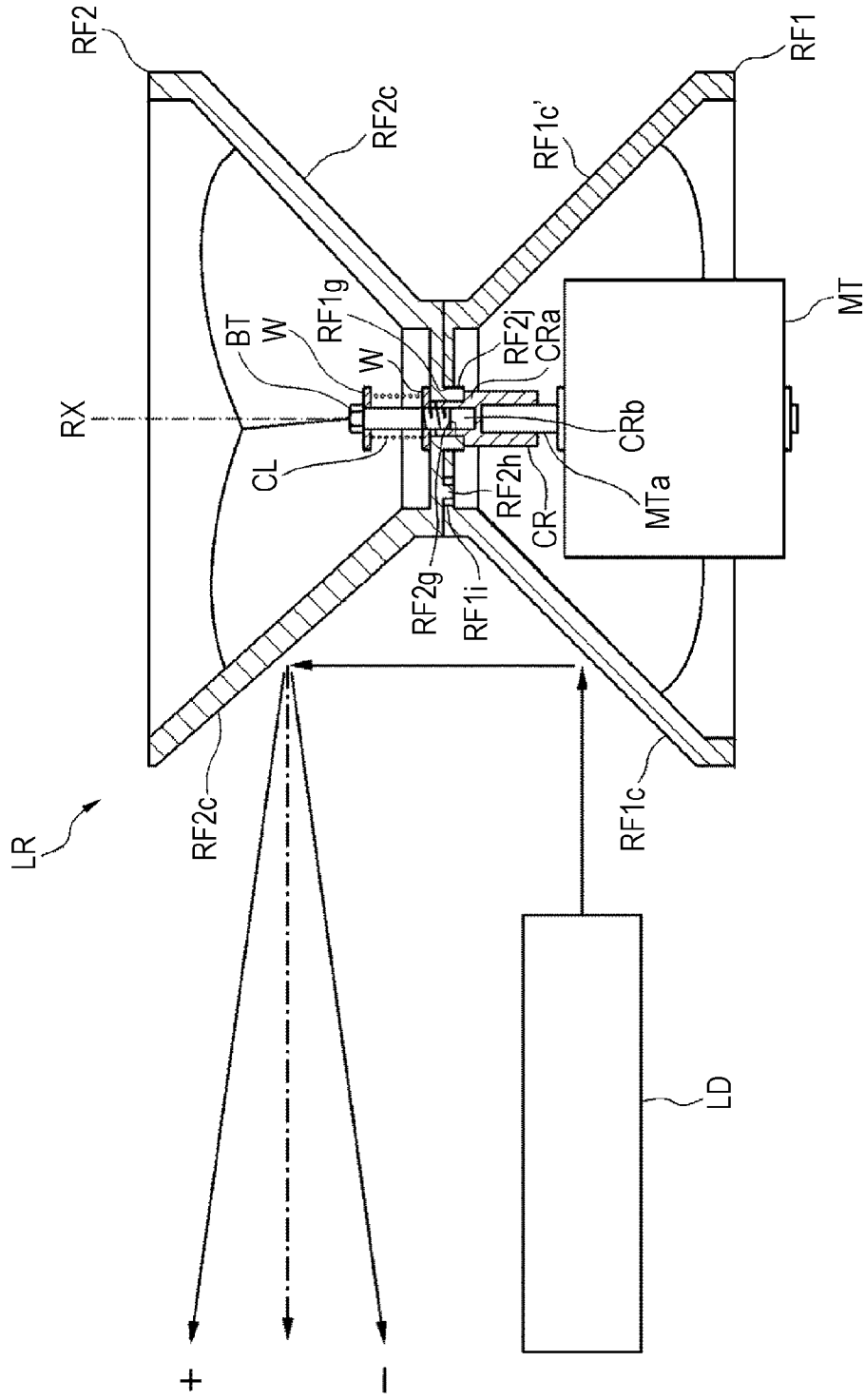
FIG. 20 is a cross-sectional view of a mirror unit MU according to the present embodiment, taken along a cross-section passing through a rotation axis.
Figure 21A:
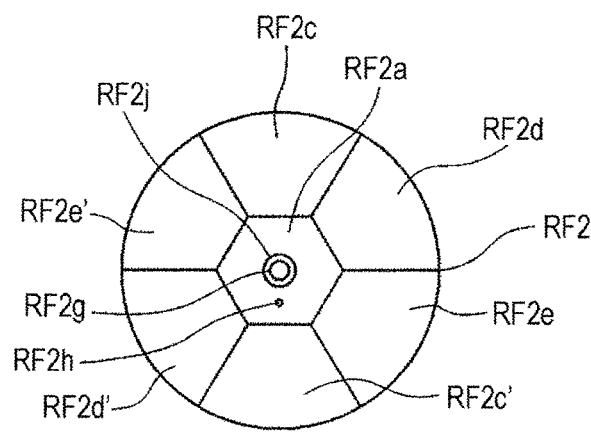
FIG. 21A is a diagram of a second reflecting member of the mirror unit MU, viewed in a rotation axis direction.
Figure 21B:
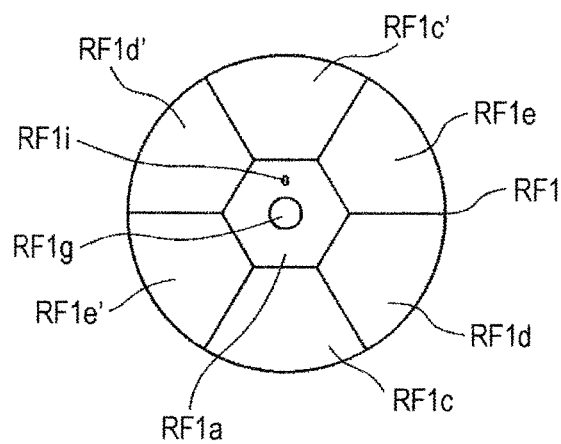
FIG. 21B is a diagram of a first reflecting member of the mirror unit MU, viewed in the rotation axis direction.

FIG. 19 is an exploded view of a mirror unit MU according to a fifth embodiment, used for the laser radar LR, and FIG. 20 is a cross-sectional view of the mirror unit MU according to the present embodiment, taken along a cross-section passing through the rotation axis. FIG. 21A is a diagram of a second reflecting member of the mirror unit MU, viewed in a rotation axis direction, and FIG. 21B is a diagram of a first reflecting member of the mirror unit MU, viewed in the rotation axis direction.

The mirror unit MU according to the present embodiment has six pairs of reflecting surfaces. Specifically, as illustrated in FIG. 21B, the first reflecting member RF1 made of resin and having a thick cup shape has a regular hexagonal bottom surface RF1a about the rotation axis RX, six substantially fan-shaped reflecting surfaces RF1c, RF1d, RF1e, RF1c', RF1d', and RF1e' crossing respective sides of the bottom surface RF1a, and a conical outer peripheral surface RF1f (FIG. 19) making contact with the reflecting surfaces. At the center of the bottom surface RF1a, the center opening RF1g is formed, and a long hole RF1i is formed in the vicinity thereof.

As illustrated in FIG. 21A, the second reflecting member RF2 is made of resin and has a thick cup shape, as similar to the first reflecting member RF1, and the second reflecting member RF2 has a regular hexagonal bottom surface RF2a about the rotation axis RX, six substantially fan-shaped reflecting surfaces RF2c, RF2d, RF2e, RF2c', RF2d', and RF2e' crossing respective sides of the bottom surface RF2a, and a conical outer peripheral surface RF2f (FIG. 19) making contact with the reflecting surfaces. At the center of the bottom surface RF2a, a large diameter boss RF2j having the center opening RF2g is formed, and a cylindrical boss RF2h is formed in the vicinity of the large diameter boss RF2j.

As illustrated in FIG. 20, during assembly, the large diameter boss RF2j is engaged with the center opening RF1g to coaxially connect the first reflecting member RF1 and the second reflecting member RF2. Furthermore, the cylindrical boss RF2h is engaged with the long hole RF1i to determine a rotational phase of the first and second reflecting members RF1 and RF2.

Furthermore, the upper end of the connection rod CR having a cylindrical shape is inserted into the center opening RF2g of the large diameter boss RF2j of the second reflecting member RF2 inserted into the center opening RF1g of the first reflecting member RF1. The large diameter portion CRa is formed on the lower end side of the connection rod CR, and brought into contact with the circumference of the lower end of the large diameter boss RF2j. In contrast, only an end of the bolt BT is threaded into the screw hole CRb formed at the upper end of the connection rod CR, but the coil spring CL is disposed between two washers W mounted on the bolt BT to generate an urging force to apply a predetermined axial force to the bolt BT, thereby a tensile force is applied to the connection rod CR between a washer W on the lower side and the large diameter portion CRa, and the second reflecting member RF1 and the connection rod CR can be fixed to each other. Engagement between the long hole RF1i and the cylindrical boss RF2h allows connection between the second reflecting member RF2 and the first reflecting member RF1 in a rotation direction.

Furthermore, a drive shaft MTa of a motor MT is fixedly press-fitted into a hollow lower end of the connection rod CR. Power is fed to the motor MT to rotate the connection rod CR through the drive shaft MTa, and the mirror unit MU can be rotated. The other configuration is similar to those of the above-mentioned embodiments.

Table 5 shows an exemplary specification of the mirror unit MU according to the fifth embodiment (inclination angle α1 of each reflecting surface of the first reflecting member relative to the rotation axis, inclination angle α2 of each reflecting surface of the second reflecting member relative to the rotation axis, relative reflection angle θ, beam emission angle β). Here, according to the present embodiment, the six pairs of reflecting surfaces can be used to obtain six kinds of beam emission angles of −10°, −6°, −2°, +2°, +6°, and +10°, as shown in Table 5. With this specification, two-dimensional wide angle scanning, ±40° in a horizontal direction and ±10° in a vertical direction, can be performed with high resolution. Further, the mirror unit MU according to the present embodiment is well balanced in rotation, and suitable for high-speed drive.

TABLE 5

(°)

| COMBINATION | RF1c/RF2c | RF1d/RF2d | RF1e/RF2e | RF1c'/RF2c' | RF1d'/RF2d' | RF1e'/RF2e' |
|---|---|---|---|---|---|---|
| FIRST REFLECTING MEMBER, INCLINATION ANGLE α1 | 45 | 45 | 45 | 45 | 45 | 45 |
| SECOND REFLECTING MEMBER, INCLINATION ANGLE α2 | 40 | 42 | 44 | 46 | 48 | 50 |
| RELATIVE REFLECTION ANGLE θ | 85 | 87 | 89 | 91 | 93 | 95 |
| BEAM EMISSION ANGLE β | −10 | −6 | −2 | +2 | +6 | +10 |

In the embodiment described above, the reflecting members RF1 and RF2 are molded from resin, but may be formed by aluminum die casting or machining. Alternatively, the reflecting members RF1 and RF2 may be formed by fixing a glass plate, a mirrored resin plate, or a mirror film, to components having the shapes of the reflecting members RF1 and RF2 and made of resin or metal such as aluminum, with an adhesive, in addition to vapor deposition of a metal material such as aluminum, gold, or silver or sputter coating.

Preferable modes of the mirror unit are collectively described below.

In the mirror unit, preferably, the first reflecting surfaces or the second reflecting surfaces have identical inclination angles relative to the rotation axis, and the other reflecting surfaces have different inclination angles relative to the rotation axis. Thus, assembly can be facilitated regardless of the combination of the first reflecting surfaces and the second reflecting surfaces during assembly.

In addition, a spacer is preferably disposed between the first reflecting member and the second reflecting member. Use of the spacer allows adjustment of interval between the pair of the first and second reflecting surfaces in a rotation axis direction. For example, spacers having a plurality of kinds of thicknesses are prepared to select a spacer having an appropriate thickness according to the specification, and the selected spacer can be incorporated into the mirror unit. The spacer is preferably provided with a retainer for the first reflecting member and the second reflecting member. Furthermore, three minute projections having the same height are provided on a surface of the spacer, opposite to the first reflecting member and the second reflecting member so that the first reflecting member and the second reflecting member are brought into contact with each other at three points, and the first reflecting member and the second reflecting member can be assembled to have an appropriate attitude.

Furthermore, a combination of a pair of the first and second reflecting surfaces can be preferably changed. When the first reflecting surfaces or the second reflecting surfaces have different inclination angles relative to the rotation axis, change of a pair of the first and second reflecting surfaces can change a sub-scanning angle, and versatility can be increased.

Furthermore, preferably, the first reflecting surfaces are formed to be arranged around a rotation axis of the first reflecting member, the second reflecting surfaces are formed to be arranged around a rotation axis of the second reflecting member, and a rotational phase of the first and second reflecting members can be changed to change the combination of pairs of the first and second reflecting surfaces. Change of the rotational phase of the first and second reflecting members to change the sub-scanning angle allows response to further wide scanning conditions.

Further, a rotational phase of the first and second reflecting members is preferably changed by changing the rotation direction of the mirror unit. Change of the rotation direction of the mirror unit to change the rotational phase of the first and second reflecting members can change a beam emission angle.

Still further, a motor, and a connection rod positioned coaxially with the rotation axis and connecting a drive shaft of the motor and the mirror unit are preferably provided. Thus, a drive force of the motor can be appropriately transmitted to the mirror unit through the connection rod. Further, when a material (resin or the like) having a small heat conductivity is used for a connection rod, a polygon mirror is prevented from being deformed by heat generated from the motor.

It is clear for a person skilled in the art from the embodiments or technical concepts described in the present specification that the present invention should not be limited to the embodiments or modifications described in the present specification, and includes other embodiments. Description and embodiments in the specification are exemplary only, and the scope of the present invention is defined by the appended claims. For example, the contents of the present invention described with reference to the drawings can be applied to all the embodiments.

Furthermore, a light receiving element may employ an avalanche photodiode (APD) instead of a photodiode (PD). Use of the APD allows detection of weak reflected light, detection of an object having a low reflectance, or detection of a longer distance. The PD or APD is preferably array elements one-dimensionally or two-dimensionally arranged. Therefore, reflected light from one beam spot can be received separately, and thus, high resolution detection can be achieved. However, the light receiving element may be a CCD or CMOS sensor. In addition, the number of reflecting surfaces of each reflecting member is not limited to exemplified three or six, may be four, five, or not less than 7, and the number of reflecting surfaces may be determined based on requirements specification of a device, including a scanning range.

REFERENCE SIGNS LIST

1 VEHICLE
1a WINDSHIELD
1b FRONT GRILLE
BT BOLT
CL COIL SPRING
CR CONNECTION ROD
CRa LARGE DIAMETER PORTION
CRb HOLE
CV CAVITY
CY CYLINDRICAL MEMBER
G SCREEN
HLD HOLDER
LD LASER DIODE
LR LASER RADAR
LS LENS
MA FIRST COMPONENT
MB SECOND COMPONENT
MC THIRD COMPONENT
MD1 UPPER MOLD
MD2 LOWER MOLD
MD2a TRANSFER SURFACE
MD2b PROJECTION
MT MOTOR
MTa DRIVE SHAFT
MU MIRROR UNIT
OBJ OBJECT
PD PHOTODIODE
RF1 FIRST REFLECTING MEMBER
RF1a BOTTOM SURFACE
RF1c REFLECTING SURFACE
RF1d REFLECTING SURFACE
RF1e REFLECTING SURFACE
RF1f OUTER PERIPHERAL SURFACE
RF1g CENTER OPENING
RF1h CYLINDRICAL BOSS
RF1i LONG HOLE
RF2 SECOND REFLECTING MEMBER
RF2a BOTTOM SURFACE
RF2c REFLECTING SURFACE
RF2d REFLECTING SURFACE
RF2e REFLECTING SURFACE
RF2f OUTER PERIPHERAL SURFACE
RF2g CENTER OPENING
RF2h CYLINDRICAL BOSS
RF2i PROJECTION
RF2j LARGE DIAMETER BOSS
RX ROTATION AXIS
SB LASER SPOT BEAM
SP SPACER
SPa CENTER OPENING
SPb LONG HOLE
SPc ARCUATE GROOVE
W WASHER

The invention claimed is:

1. A mirror unit comprising a plurality of pairs of first reflecting surfaces and second reflecting surfaces, being inclined relative to a rotation axis, and extending in directions crossing each other, the mirror unit rotating about the rotation axis, wherein a beam emitted from a light source is reflected on a first reflecting surface of the mirror unit, and then reflected on a second reflecting surface paired with the first reflecting surface, and the beam is emitted while being scanned over an object according to the rotation of the mirror unit, wherein
    the mirror unit includes at least a first reflecting member on which the first reflecting surfaces are formed, and a second reflecting member on which the second reflecting surfaces are formed,
    the first reflecting member and the second reflecting member are combined to select an emission angle of a beam emitted from the mirror unit, and crossing angles of respective pairs of the first and second reflecting surfaces configured by combining the first and second reflecting members to select an emission angle are constant irrespective of rotation of the mirror.

2. The mirror unit according to claim 1, wherein the first reflecting surfaces or the second reflecting surfaces have identical inclination angles relative to the rotation axis, and the other reflecting surfaces have different inclination angles relative to the rotation axis.

3. The mirror unit according to claim 2, wherein a spacer is disposed between the first reflecting member and the second reflecting member.

4. The mirror unit according to claim 2, wherein a combination of pairs of the first reflecting surfaces and second reflecting surfaces can be changed.

5. The mirror unit according to claim 2, further comprising a motor, and a connection rod positioned coaxially with the rotation axis and connecting a drive shaft of the motor and the mirror unit.

6. A distance measurement device comprising the mirror unit according to claim 2.

7. A laser radar comprising:
a light source for emitting light to an object;
the mirror unit according to claim 2, the mirror unit reflecting light emitted to and reflected from the object;
a lens for condensing light reflected from the mirror unit; and
a light receiving element for receiving light condensed by the lens.

8. The mirror unit according to claim 1, wherein a spacer is disposed between the first reflecting member and the second reflecting member.

9. The mirror unit according to claim 8, wherein a combination of pairs of the first reflecting surfaces and second reflecting surfaces can be changed.

10. The mirror unit according to claim 8, further comprising a motor, and a connection rod positioned coaxially with the rotation axis and connecting a drive shaft of the motor and the mirror unit.

11. The mirror unit according to claim 1, wherein a combination of pairs of the first reflecting surfaces and second reflecting surfaces can be changed.

12. The mirror unit according to claim 11, wherein the first reflecting surfaces are formed to be arranged around a rotation axis of the first reflecting member, the second reflecting surfaces are formed to be arranged around a rotation axis of the second reflecting member, and a rotational phase of the first reflecting member and the second reflecting member can be changed to change the combination of pairs of the first reflecting surfaces and second reflecting surfaces.

13. The mirror unit according to claim 12, wherein a rotational phase of the first reflecting member and the second reflecting member is changed by changing the rotation direction of the mirror unit.

14. The mirror unit according to claim 1, further comprising a motor, and a connection rod positioned coaxially with the rotation axis and connecting a drive shaft of the motor and the mirror unit.

15. A distance measurement device comprising the mirror unit according to claim 1.

16. A mobile body comprising the distance measurement device according to claim 15.

17. A fixed object comprising the distance measurement device according to claim 15.

18. A laser radar comprising:
a light source for emitting light to an object;
the mirror unit according to claim 1, the mirror unit reflecting light emitted to and reflected from the object;
a lens for condensing light reflected from the mirror unit; and
a light receiving element for receiving light condensed by the lens.

19. A mobile body comprising the laser radar according to claim 18.

20. A fixed object comprising the laser radar according to claim 18.

* * * * *